(12) United States Patent
Narasimhan et al.

(10) Patent No.: US 9,344,858 B2
(45) Date of Patent: May 17, 2016

(54) OVERLAYING VIRTUAL BROADCAST DOMAINS ON AN UNDERLYING PHYSICAL NETWORK

(71) Applicant: ARUBA NETWORKS, INC., Sunnyvale, CA (US)

(72) Inventors: Partha Narasimhan, Saratoga, CA (US); Anupam Wadhawan, San Jose, CA (US); Gopal Agarwal, Karnataka (IN); Keerti Melkote, Saratoga, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 0 days.

(21) Appl. No.: 14/086,918

(22) Filed: Nov. 21, 2013

(65) Prior Publication Data
US 2014/0321445 A1      Oct. 30, 2014

Related U.S. Application Data

(63) Continuation of application No. 13/563,553, filed on Jul. 31, 2012, now Pat. No. 8,649,383.

(51) Int. Cl.
| | |
|---|---|
| *H04W 4/06* | (2009.01) |
| *H04L 12/46* | (2006.01) |
| *H04W 4/08* | (2009.01) |
| *H04W 84/12* | (2009.01) |
| *H04L 12/54* | (2013.01) |
| *H04W 4/02* | (2009.01) |
| *H04W 4/04* | (2009.01) |

(52) U.S. Cl.
CPC ............. *H04W 4/06* (2013.01); *H04L 12/4641* (2013.01); *H04W 4/08* (2013.01); *H04W 84/12* (2013.01); *H04L 12/5689* (2013.01); *H04W 4/02* (2013.01); *H04W 4/043* (2013.01)

(58) Field of Classification Search
CPC .................. H04L 12/4641; H04L 12/5689
See application file for complete search history.

(56) References Cited

U.S. PATENT DOCUMENTS

| | | | |
|---|---|---|---|
| 6,061,334 A | 5/2000 | Berlovitch et al. | |
| 6,085,238 A * | 7/2000 | Yuasa et al. ................... | 709/223 |
| 6,614,787 B1 | 9/2003 | Jain et al. | |
| 7,095,740 B1 | 8/2006 | Jagannath et al. | |
| 7,519,056 B2 | 4/2009 | Ishwar et al. | |
| 7,633,950 B2 | 12/2009 | Molina | |
| 7,792,058 B1 | 9/2010 | Yip et al. | |
| 7,831,270 B2 | 11/2010 | Kalley et al. | |
| 7,969,994 B2 | 6/2011 | Jorgensen | |
| 2002/0085506 A1 | 7/2002 | Hundscheidt et al. | |
| 2003/0174725 A1* | 9/2003 | Shankar ........................ | 370/428 |
| 2005/0083949 A1 | 4/2005 | Dobbins et al. | |
| 2006/0013171 A1* | 1/2006 | Ahuja et al. .................. | 370/338 |
| 2006/0221968 A1 | 10/2006 | Razdan et al. | |

(Continued)

OTHER PUBLICATIONS

International Search Report and Written Opinion, International Application No. PCT/US2013/051907, Date: Feb. 18, 2014, pp. 1-7.

*Primary Examiner* — Warner Wong
(74) *Attorney, Agent, or Firm* — Hewlett Packard Enterprise Patent Department

(57) ABSTRACT

Operations include determining that a subset of devices, from a plurality of devices, are executing a same application, located in a same geographical location, or correspond to a same user. Responsive to the determining operation, a group with the subset of devices is created and communication between the devices is supported.

18 Claims, 8 Drawing Sheets

(56) References Cited

U.S. PATENT DOCUMENTS

| | | |
|---|---|---|
| 2007/0036118 A1* | 2/2007 | Shaffer et al. ............... 370/338 |
| 2007/0097972 A1 | 5/2007 | Jain et al. |
| 2007/0116014 A1 | 5/2007 | Shuen et al. |
| 2007/0171918 A1* | 7/2007 | Ota et al. ............... 370/395.53 |
| 2007/0280195 A1* | 12/2007 | Shaffer et al. ............... 370/351 |
| 2007/0280203 A1* | 12/2007 | Shaffer et al. ............... 370/352 |
| 2008/0247373 A1 | 10/2008 | Synnergren et al. |
| 2009/0034470 A1 | 2/2009 | Nagarajan et al. |
| 2010/0157870 A1 | 6/2010 | Song et al. |
| 2011/0110377 A1 | 5/2011 | Alkhatib et al. |
| 2011/0158208 A1 | 6/2011 | Solanki et al. |
| 2012/0176934 A1 | 7/2012 | Farinacci et al. |
| 2012/0275347 A1 | 11/2012 | Banerjee et al. |
| 2014/0204824 A1* | 7/2014 | Chen et al. ............... 370/312 |

* cited by examiner

| POLICY 490 | DEVICE 492 | RADIO/PORT 494 | GROUP 496 |
|---|---|---|---|
| POLICY C 475C | ACCESS POINT 430 | RADIO 1 480A | GROUP 3 470 |
| POLICY B 475B | ACCESS POINT 430 | RADIO 2 480B | GROUP 2 460 |
| POLICY C 475C | ACCESS POINT 430 | PORT 1 485A | GROUP 3 470 |
| POLICY A 475A | ACCESS POINT 430 | PORT 2 485B | GROUP 1 450 |
| POLICY B 475B | ACCESS POINT 435 | RADIO 1 480C | GROUP 2 460 |
| POLICY A 475A | ACCESS POINT 435 | PORT 1 485C | GROUP 1 450 |
| POLICY A 475A | ACCESS POINT 435 | PORT 2 485D | GROUP 1 450 |

| L3 HEADER 530 | L2 HEADER 540 | PAYLOAD 550 |

| TIME 560 | LOCATION 570 | GROUP 580 |
|---|---|---|
| $t_1$ | 1st floor | GROUP 1 |
| $t_2$ | 2nd floor | GROUP 2 |
| ...... | ...... | ...... |

OVERLAYING VIRTUAL BROADCAST DOMAINS ON AN UNDERLYING PHYSICAL NETWORK

BENEFIT CLAIMS; CROSS-REFERENCE TO RELATED APPLICATIONS

This application is a Continuation of application Ser. No. 13/563,553 filed on Jul. 31, 2012, the contents of which are hereby incorporated by reference. The applicant(s) hereby rescind any disclaimer of claim scope in the parent application(s) or the prosecution history thereof and advice the USPTO that the claims in this application may be broader than any claim in the parent application(s).

FIELD

The present disclosure relates to wireless broadcast in a wireless local area network. In particular, the present disclosure relates to overlaying one or more virtual broadcast domains or groups on an underlying physical network in a wireless local area network.

BACKGROUND

Wireless digital networks, such as networks operating under the current Electrical and Electronics Engineers (IEEE) 802.11 standards, are spreading in their popularity and availability. With such popularity, however, come problems of reliable broadcast of layer-2 and/or layer-3 traffic. Broadcast traffic in computer networking generally refers to traffic that is simultaneously addressed to all devices connected to a specific network as opposed to unicast or multicast traffic.

Specifically, in Transmission Control Protocol (TCP)/Internet Protocol (IP) networking, e.g., layer-3 in the Open Systems Interconnection (OSI) Model, the highest possible address in the IP network range is reserved as the broadcast address. For example, in the network 192.168.0.0/24, the broadcast address may be reserved as 192.168.0.255. In Media Access Control (MAC) addressing, e.g., layer-2 on the OSI model, the broadcast address may be reserved as the MAC address FF:FF:FF:FF:FF:FF (also known as the "all F" address). Packets in layer-3 traffic or frames in layer 2 traffic that are sent to the broadcast address will be sent to all nodes within their corresponding layer-3 or layer-2 broadcast domain.

Conventionally, connectivity in layer-2 is assumed when such broadcast traffic are sent to their corresponding layer-3 or layer-2 broadcast domains. However, in reality, the underlying layer-2 network links may not always be available, for example, due to large network traffic. Therefore, layer-3 broadcast traffics may not be successfully delivered when, for example, the underlying layer-2 connectivity is broken.

To solve this issue, network administrators have to configure the network with certain settings, which often force network topology upon client devices in the network. As an example, a network administrator may configure a printer and all computer desktops that use that printer to be located within the same layer-2 broadcast domain. The issue, however, becomes more complicated when the client devices include mobile devices that have roaming capabilities. When a client device moves from one physical location to another physical location that belongs to a different layer-2 broadcast domain, the client device will need to be specially configured by the network administrator to be maintained on the same layer-2 broadcast domain in order to provide for uninterrupted network services, e.g., access to printing services. Moreover, such special configuration typically require manual configuration by the network administrator. Thus, it is difficult to adapt to dynamic network topology changes.

Moreover, many applications and/or services use discovery mechanisms that are unable to discover services or devices outside physical layer-2 boundaries. Accordingly, conventional solutions typically require network topology modifications or constraints in order for such applications and/or services to function properly.

BRIEF DESCRIPTION OF THE DRAWINGS

The present disclosure may be best understood by referring to the following description and accompanying drawings that are used to illustrate embodiments of the present disclosure.

DETAILED DESCRIPTION

In the following description, several specific details are presented to provide a thorough understanding. While the context of the disclosure is directed to virtual broadcast domains or groups in wireless network, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to virtual broadcast domains in a wireless local area network. In particular, the present disclosure relates to overlaying one or more virtual broadcast domains or groups on an underlying physical network in a wireless local area network.

With the solution provided herein, the disclosed network device receives a broadcast message from a member device (e.g. a client device that is a member) of a broadcast group. The broadcast group includes a subset of devices sharing at least one common property. The member device can receive a broadcast or multicast message from other member devices, but not from a non-member device of the first broadcast group. Furthermore, the broadcast group includes one of (i) a subset of devices from a single virtual local area network, and (ii) at least two subsets of devices from two or more virtual local area networks. The network device then determines the broadcast group associated with the received broadcast message based on the common property, and then transmits the received broadcast message to other member devices in the broadcast group.

Computing Environment

Figure 1:
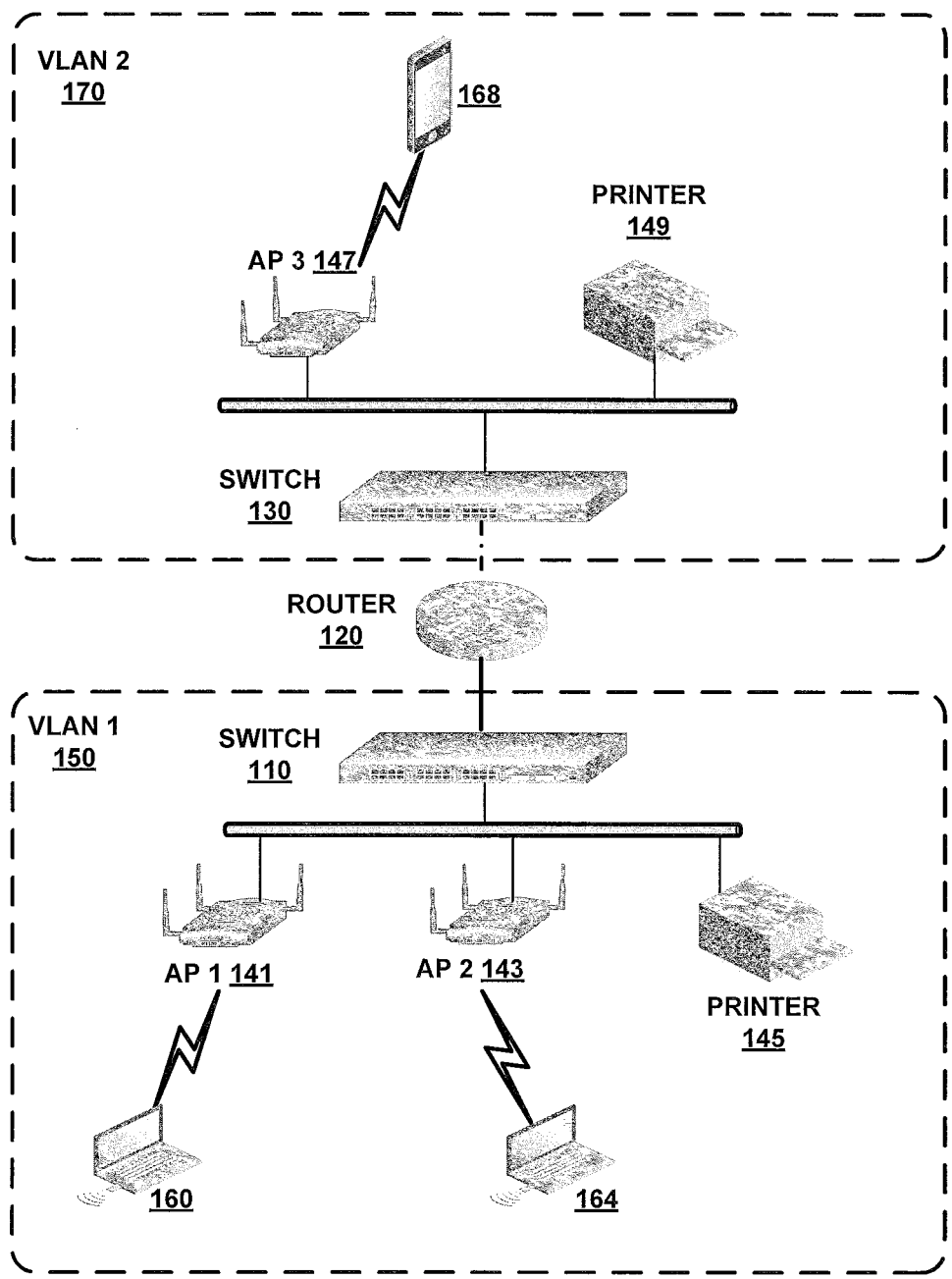
FIG. 1 is a diagram illustrating an exemplary wireless network environment according to embodiments of the present disclosure.

FIG. 1 shows an exemplary wireless digital network environment according to embodiments of the present disclosure. FIG. 1 includes a router 120 that connects a first virtual local area network (VLAN), e.g., VLAN 1 150, and a second VLAN, e.g., VLAN 2 170. VLAN 1 150 includes a management network device, e.g., switch 110, that connects a plurality of network devices, such as access point AP1 141, access point AP2 143, and printer 145, through wired or wireless connections. Likewise, VLAN 2 170 includes a management network device, e.g., switch 130, that connects a plurality of network devices, e.g., access point AP3 147 and printer 149, through wired or wireless connections. Furthermore, each network or sub-network can additionally include other management network devices, such as a router, a network server, and so on.

The network depicted in FIG. 1 may operate on a private network including one or more local area networks. The local area networks may be adapted to allow wireless access, thereby operating as a wireless local area network (WLAN). In some embodiments, one or more networks may share the same extended service set (ESS) although each network corresponds to a unique basic service set (BSS) identifier.

In addition, network depicted in FIG. 1 may include multiple network control plane devices, such as network controllers, access points or routers capable of controlling functions, etc. Each network control plane device may be located in a separate sub-network, such as VLAN 1 150 or VLAN 2 170. The network control plane device may manage one or more network management devices, such as access points or network servers, within the sub-network.

Moreover, network depicted in FIG. 1 may include multiple client devices or wireless stations. For example, client device 160 is connected via a wireless radio link with AP1 141; and, client device 164 is connected via a wireless radio link with AP2 143 in VLAN 1 150. Similarly, client device 168 is connected via a wireless radio link with AP3 147 in VLAN 2 170.

During operations, a wireless station, such as client device 160, client device 164, or client device 168, is associated with a respective access point, e.g., access point AP1 141, access point AP2 143, or access point AP3 147, etc.

Each wireless station may transmit a layer-2 or layer-3 broadcast message. For example, when a layer-2 broadcast message is transmitted by client device 160, the layer-2 broadcast message will be transmitted via switch 110 to all other client devices and network devices, e.g., client device 164, printer 145, that are located within VLAN 1 150. However, a layer-2 broadcast message will not be received by client device 168 or printer 149, because router 120 will recognize, based on layer-2 header of the broadcast message, that the broadcast message from client device shall not be routed across the layer-2 boundary of VLAN 1 150.

As another example, assuming that both VLAN 1 150 and VLAN 2 170 are in the same layer-3 network domain. When client device 160 transmits a layer-3 broadcast message, the layer-3 broadcast message shall be received by all other client devices and network devices in the same layer-3 network, which, for example, includes both VLAN 1 150 and VLAN 2 170. Therefore, devices that will receive the layer-3 broadcast message may include client device 164, client device 168, printer 145, printer 149, etc. In such scenario, router 120 will recognize based on layer-3 header of the broadcast message that the message is to be routed within the boundary of its corresponding layer-3 network. Therefore, router 120 will allow the layer-3 broadcast message to pass through and to be routed to network devices in VLAN 2 170.

Note that although only two VLANs are depicted in FIG. 1, more VLANs may be included in the system without departing from the spirit of the present disclosure. Furthermore, although only layer-2 sub-network divisions are depicted in FIG. 1, other network subdivisions at other layers may also be included. Thus, the broadcast message transmitted from the wireless station can be at any layer higher than a base layer, e.g., a physical layer network.

It is also important to note that, when router 120 passes through the layer-3 broadcast message originated from client device 160, there is a presumed underlying layer-2 connectivity between VLAN 1 150 and VLAN 2 170. If, for instance, the network segment between router 120 and switch 130 is broken for various reasons. The layer-3 broadcast message will not be properly delivered. Also, client devices, such as client device 160, may not be able to access network printer 149. Thus, as a practical matter, a network administrator often needs to force network topology on certain client devices and/or network devices in order to guarantee network services. For example, the network administrator may have to configure client device 160 and printer 149 to be located within the same layer-2 network domain in order to guarantee printing service by printer 149 to client device 160.

According to embodiments of the present disclosure, however, virtual broadcast domains are created and overlaid on underlying physical networks or virtual local area networks. The virtual broadcast domains have similar properties of underlying physical networks, and thus allowing a network administrator to configure the virtual broadcast domain the same way as he/she configures an underlying physical sub-network. Nevertheless, the virtual broadcast domain removes the conventional constraints on the underlying physical network topology. In other words, network resources are necessarily required to be located within the same layer-2 network domain as a client device in order for the client device to be able to discover and use the network resources.

Virtual Broadcast Groups

Figure 2:
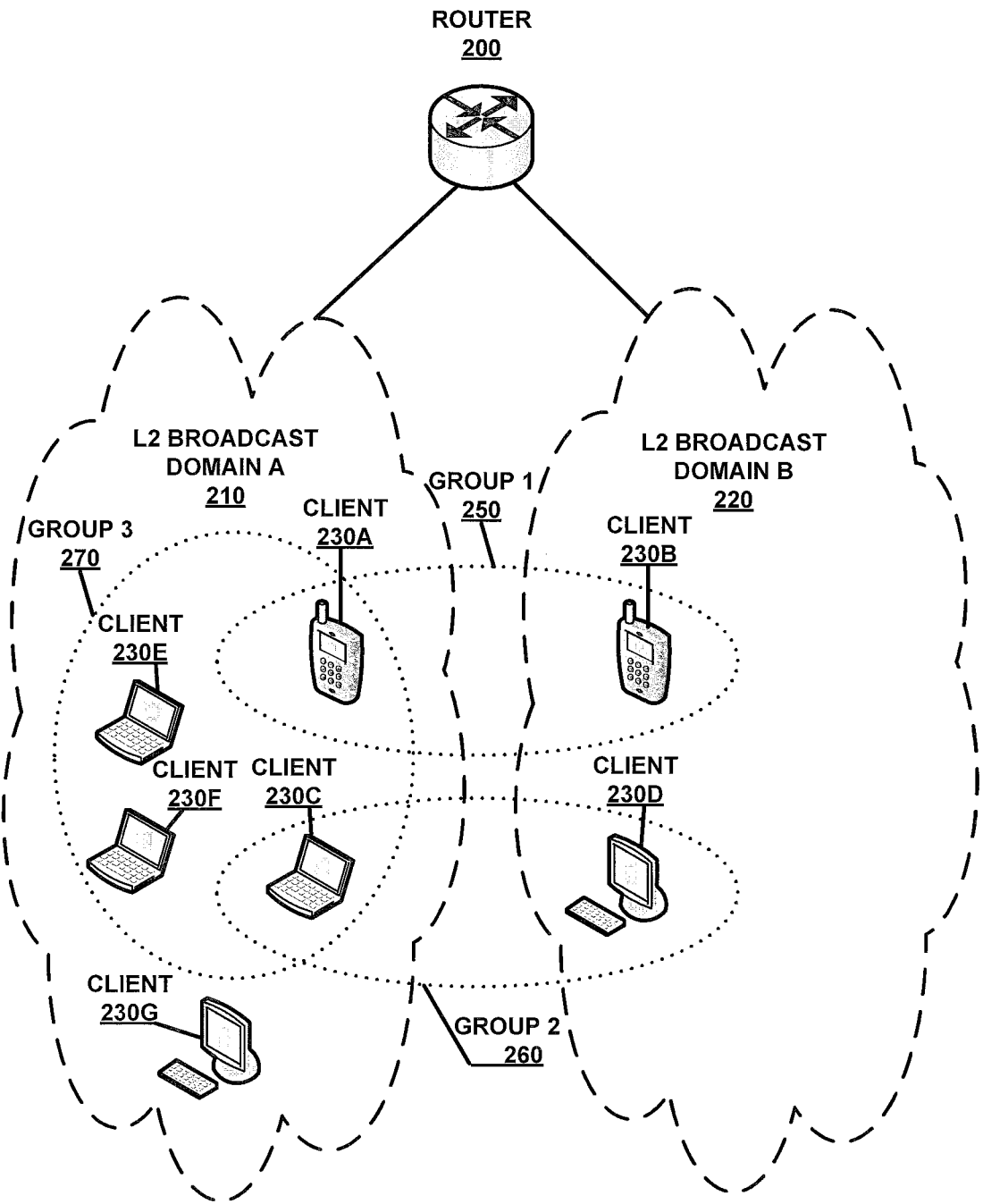
FIG. 2 is a diagram illustrating exemplary virtual broadcast domains overlaid upon layer-2 network broadcast domains according to embodiments of the present disclosure.

FIG. 2 illustrates a diagram showing exemplary virtual broadcast groups overlaid upon layer-2 network broadcast domains. FIG. 2 includes a network management device (such as router 200), which connects a first layer-2 broadcast domain A 210 and a second layer-2 broadcast domain B 220.

In the illustrated example, layer-2 broadcast domain A 210 includes a number of client devices, such as, client 230A, client 230C, client 230E, client 230F, client 230G, etc. Likewise, layer-2 broadcast domain B 220 includes a number of client devices, such as, client 230B, client 230D, etc.

The client devices are grouped into a number of virtual broadcast domain groups, for example, based on predetermined virtual broadcast domain membership policies. Specifically, a first virtual broadcast domain group, group 1 250, may include client 230A from layer-2 broadcast domain A 210 and client 230B from layer-2 broadcast domain B 220; a second virtual broadcast domain group, group 2 260, may include client 230C from layer-2 broadcast domain A 210 and client 230D from layer-2 broadcast domain B 220; a third virtual broadcast domain group, group 3 270, may include client 230A, client 230C, client 230E, and client 230F from layer-2 broadcast domain A 210; etc. In this example, client 230G which belongs to layer-2 broadcast domain A 210 is not a member of any virtual broadcast domain.

In some embodiments, the virtual broadcast domains are overlaid upon the underlying physical networks, such that the underlying layer-2 broadcast domains are no longer visible to the network users and/or administrators. Thus, a network administrator may configure a virtual broadcast domain the same way as he/she configures a virtual local area network. As a result, a layer-2 or layer-3 broadcast message transmitted on the virtual broadcast domain will only be transmitted to members of the corresponding virtual broadcast domain group regardless of the underlying physical network topologies. For example, a broadcast message from client 230E on virtual broadcast domain group 3 270 will only be received by client 230A, client 230C, and client 230E. The broadcast message, however, will not be received by client 230G even though client 230G is located within the same layer-2 network as client 230E, because client 230G is not a member of virtual broadcast domain group 3 270.

In some embodiments, client devices may be allowed to transmit a traditional layer-2 broadcast message. For example, depending on the network configuration by a network administrator, client 230G may be allowed to transmit a layer-2 broadcast message on layer-2 broadcast domain A 210. As a result, all other devices on layer-2 broadcast domain A 210, including client 230A, client 230C, client 230E, and client 230F, will receive the layer-2 broadcast message originated from client device 230G.

In some embodiments, a network device operating on the control plane may listen to a broadcast message originated from a client device in one of many different physical networks, determine whether and which virtual broadcast domain that the originating client device belongs to, and control the broadcast message to be transmitted to other devices, including devices in other physical networks, within the same virtual broadcast domain.

Furthermore, the virtual broadcast domains can include any subset of network devices and client devices that share a predetermined set of common properties. This may be determined, for example, by being governed by the same group of virtual broadcast domain policies. The virtual broadcast domain policies may include one or more of a role-based policy, a user-based policy, a location-based policy, a service-based policy, an application-based policy, etc. As a result, discovery of network resources is available only for groups of devices or users that have a certain common set of attributes.

For example, assuming that in a network with a large number of devices that offer a particular service, a user attempts to discover his/her device among the large number of similar devices offering the same service. According to embodiments of the present disclosure, the large number of similar devices may be divided into multiple virtual broadcast domains/groups, whereas devices in each individual virtual broadcast domain/group share a common set of attribute values with respect to the properties of the virtual broadcast domain/group. Moreover, the subdivided virtual broadcast domain/group includes a limited number of devices, and thus making the discovery of the user's device easier.

In one example, an important attribute is the user's current location. Specifically, the user may desire for the ability to quickly discover resources nearby without the burden of having to search through a large number of such resources on the network. In this example, the virtual broadcast domains/groups may be created based on locations of the client devices and network devices in the network. In other examples, a virtual broadcast domain/group may be created by grouping members based on properties that they share, e.g., location, property of a certain user or set of users, etc.

As another example, when a user on a network chooses to share a resource on the network but the sharing needs to be limited to a subset of users that have some other common properties, such as, a common social network platform, a meeting participants, etc. In this example, a virtual broadcast domain/group may be created based on the common properties that the user's sharing criteria are based on upon.

Moreover, it shall be noted that the grouping that a virtual broadcast domain/group is based upon could be temporal by nature. For example, a virtual broadcast domain/group may exist only for a certain period of time during which the sharing of resource exists. Alternatively, a virtual broadcast domain/group may be created based on multiple groupings, one or more of which exist only during a certain period of time.

With the increased use of service discovery protocols for network service discovery, address assignment, and name resolution, it is desirable to overlay a virtual broadcast domain/group that is transient in nature on one or more underlying physical network for achieving easy service discovery and setup. The solution disclosed in the present disclosure includes mechanisms for creating one or more virtual broadcast domains/groups that are either permanent or transient. The membership of these virtual broadcast domains/groups is determined by one or more common properties that group members share with each other.

In addition, the solution also includes selective propagation of service discovery packets to members of the group without burdening the underlying physical network to conform to topologies that enable such propagation. Instead of broadcasting to every member in the underlying layer-2 network, once members of a group within the same virtual broadcast domain/group discover the presence of each other's resources that offer a particular service, the disclosed network device can either propagate service data packets by unicast between members of the group or by setting up a specific multicast group that allows for easy propagation of such packets among members of the group.

Furthermore, group memberships can be either implicit as determined by network topology (for example, a membership in a VLAN), or explicit as determined by an external mechanism, such as a network policy, a organizational membership, an access control role, a membership of a group on a media sharing platform, etc.

Membership Policy and Group Management

Figure 3A:
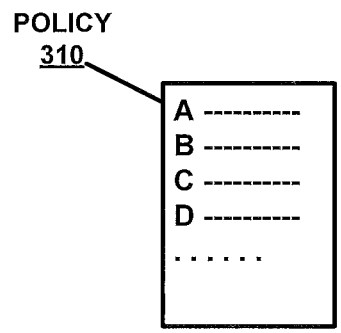
FIGS. 3A-3B illustrate exemplary policy and/or group management according to embodiments of the present disclosure.
Figure 3B:
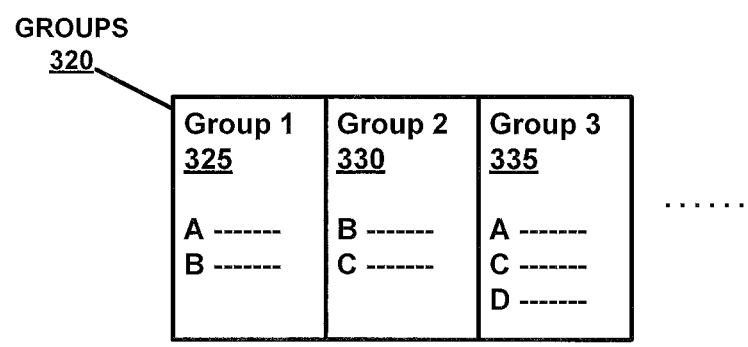

FIGS. 3A-3B illustrate exemplary policy and/or group management according to embodiments of the present disclosure. Specifically, FIG. 3A illustrates an exemplary policy 310. In this example, policy 310 may include a number of criteria, such as A, B, C, D, and so on.

Note that, the policies can be based on user, role, location, service, application, or any other attributes. In some embodiments, the policies may be user-based. For example, a policy may specify that a user shall be allowed to use all devices that the user owns in the network. In some embodiments, the policies may be role-based. For example a policy may specify that a user that logs into a client device in the role of an instructor can access projecting devices in classrooms. In some embodiments, the policies may be location-based. For example, a policy may specify that a device may access any network resource that is located within a physical proximity. There can be many other ways to create such policies. In some embodiments, the policies may be service-based. For example, a policy may specify that client devices using the same network service can discover each other. In some embodiments, the policies may be application-based. For example, a policy may specify that users or client devices that are logged onto the same application can discover each other and share resources. Also, the policies may be created based on a combination of multiple factors, e.g., a user in the role of instructor may only access network projectors that are physically located within certain proximity.

Furthermore, a network administrator may leverage existing access control policies into the virtual broadcast domain/ group. For example, a network administrator may be allowed to link an existing ACL with a virtual broadcast domain/ group, or import an existing ACL into a virtual broadcast domain/group.

Moreover, the policies may be transient or permanent. For example, a policy may be associated with an expiration date and time, or a timeout value. If the expiration or timeout is set for the policy, then the policy will no longer be valid for the virtual broadcast domain/group it binds to after it expires.

FIG. 3B illustrates an exemplary grouping of the policies illustrated in FIG. 3A. In this example, groups 320 include group 1 325, group 2 330, group 3 335, etc. Each group of policies can include any number and/or combination of policies as defined in policy 310. For example, group 1 325 includes policies A and B; group 2 330 includes policies B and C; group 3 335 includes policies A, C, and D; etc.

Furthermore, each group of policies corresponds to a group that defines a subset of users and/or devices that can discover each other using layer-2 broadcast messages. In some embodiments, in particular, the definition of group has at least two distinct implications. First, a broadcast message from a member of the group can only be received by other members of the same group. Second, a broadcast message from a member of the group shall not be received by a non-member of the group.

It is also important to note that the disclosed network device does not need to have complete visibility of members of the virtual broadcast domain/group. For example, the disclosed network device may receive a partial list of client devices in a virtual broadcast domain/group from a control plane device, which is located within the same layer-2 network domain. The list may be a partial list that includes only client devices in the same layer-2 network domain that belong to the virtual broadcast domain/group. Thus, it is possible that other client devices that are in a different layer-2 network domain may also belong to the same virtual broadcast domain/group. It is sufficient for disclosed network device to determine that a port is connected to another network device that is connected directly or indirectly with other members of the virtual broadcast domain/group.

A Broadcast Group Example

Figure 4A:
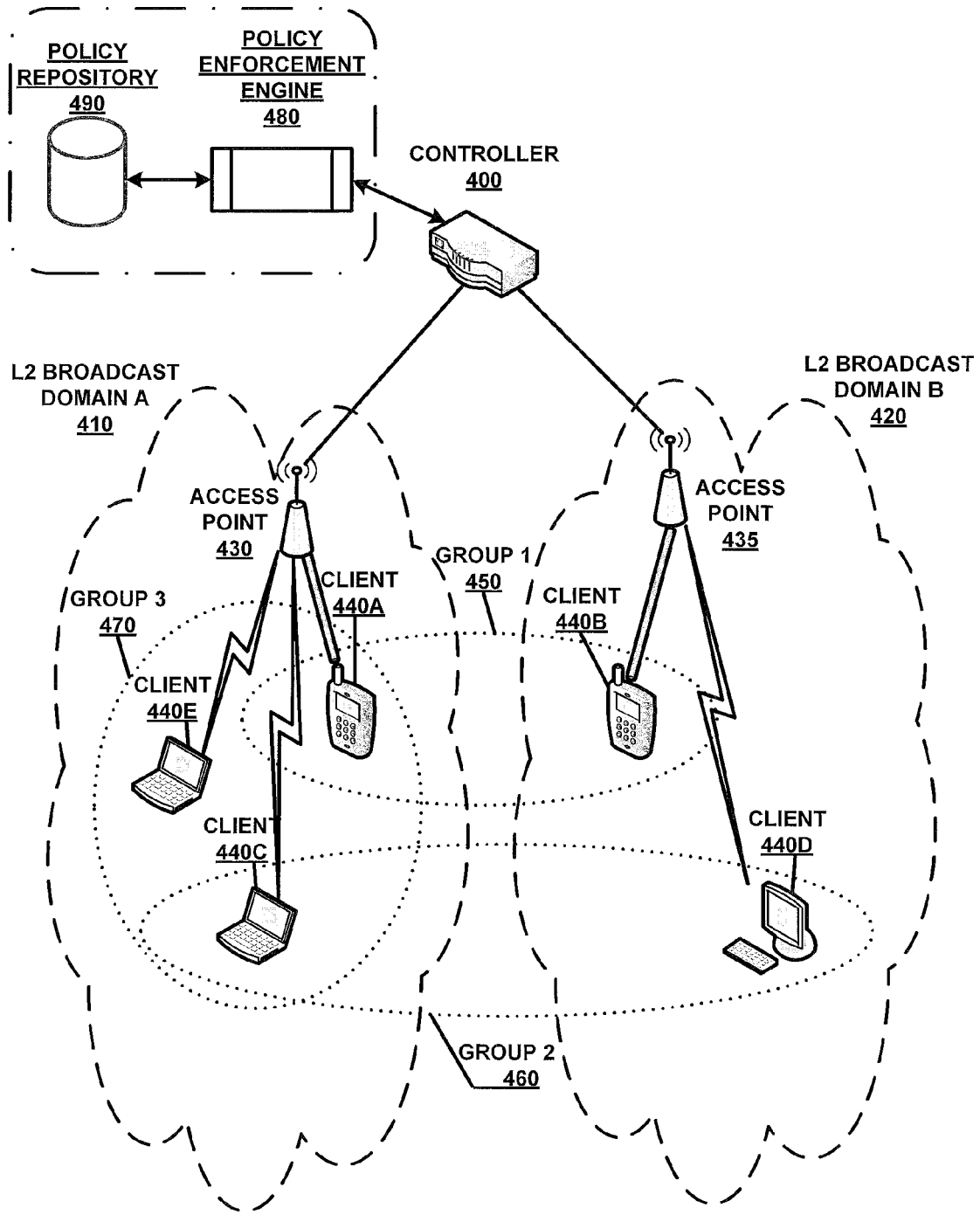
FIGS. 4A-4C illustrate exemplary policy and/or group management according to embodiments of the present disclosure.
Figures 4B, 4C:
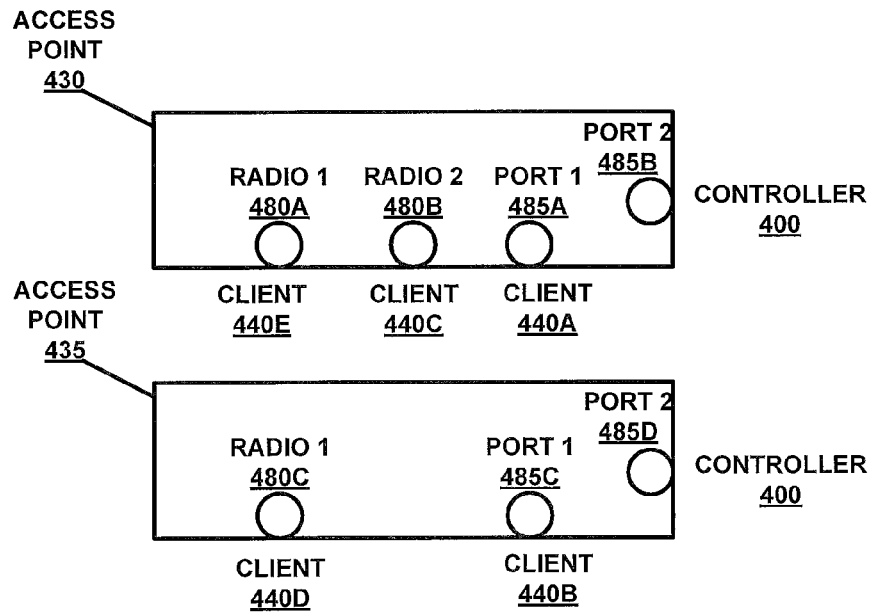

FIGS. 4A-4C illustrate a detailed example of virtual broadcast domains and their policy and/or group management in accordance with the present disclosure. In particular, FIG. 4A shows a diagram illustrating an example network environment. The network in this example includes a controller 400, a layer-2 broadcast domain A 410, and a layer-2 broadcast domain B 420.

Also, FIG. 4A includes two logical entities: policy repository 490 and policy enforcement engine 480. Policy enforcement engine 480 generally retrieves virtual broadcast domain policies from policy repository 490 and determines how to enforce or apply virtual broadcast domain policies to network devices and client devices in the network. Policy repository 490 and policy enforcement engine 480 may reside, aggregatively or distributively, on controller 400 and/or any other network devices that are capable of communicating with controller 400.

In addition, in the example illustrated in FIG. 4A, layer-2 broadcast domain A 410 further includes one or more network devices, such as access point 430. Each network device is also connected to zero or more client devices. For example, access point 430 is connected to client device 440A via a wired port (port 1), to client device 440E via a wireless radio (radio 1), to client device 440C via a wireless radio (radio 2), and to router 400 via a wired port (port 2).

Likewise, in the illustrated example, layer-2 broadcast domain B 420 includes one or more network devices, such as access point 435. Each network device is also connected to zero or more client devices. For example, access point 435 is connected to client device 440B via a wired port (port 1), to client device 440D via a wireless radio (radio 1), and to router 400 via a wired port (port 2).

In this example, three virtual broadcast domains are configured in the network. Specifically, group 1 450 includes client device 440A and client device 440B; group 2 460 includes client device 440C and client device 440D; and group 3 470 includes client device 440A, client device 440C, and client device 440E. Note that, it is possible for a client device or a network device to belong to multiple virtual broadcast domains. Here, client device 440C belongs to both virtual broadcast domain group 2 460 and group 3 470; and, client device 440A belongs to both virtual broadcast domain group 1 450 and group 3 470. In some embodiments, such client device can access network resources and be discovered on the multiple virtual broadcast domains. In other embodiments, the virtual broadcast domain corresponding to such a client device may be determined dynamically based on attributes, such as user, role, location, service, application, etc.

Moreover, controller 400 is connected to both access point 430 in layer-2 broadcast domain A 410 and access point 435 in layer-2 broadcast domain B 420. In one embodiment, controller 400 receives and responds to a query from access point 430 inquiring whether controller 400 is connected, either directly or indirectly, to any other network nodes in a given virtual broadcast domain, e.g., group 1 450. Alternatively, controller 400 may receive a virtual broadcast domain query from a first port, and respond to the query by providing a list of all virtual broadcast domains connected to all ports other than the first port of controller 400.

FIG. 4B illustrates exemplary network devices supporting virtual broadcast domains in the example shown in FIG. 4A. Specifically, FIG. 4B depicts access point 430 and access point 435. Access 430 includes a plurality of radios, e.g., radio 1 480A and radio 2 480B, and a plurality of ports, e.g., port 1 485A and port 2 485B. As described above, in this example, radio 1 480A of access point 430 is connected to client device 440E; radio 2 480B of access point 430 is connected to client device 440C; port 1 485A of access point 430 is connected to client device 440A, and port 2 485B of access point 430 is an uplink connection to controller 400.

Similarly, access point 435 includes radio 1 480C, port 1 485C, and port 2 485D. Furthermore, radio 1 480C of access point 435 is connected to client device 440D; port 1 485C of access point 435 is connected to client device 440B; and port 2 485D is an uplink connection to controller 400.

FIG. 4C illustrates an example group and policy management scheme for the example illustrated in FIG. 4A. FIG. 4C includes at least the following columns or fields—policy 490, device 492, radio and/or port 494, group 496, etc.

Policy 490 generally defines a virtual broadcast domain/ group membership policy. For example, policy A 475A may specify that a user may use all devices that he/she owns in the network. Thus, when the user logs in a client device on the network, the client device will become a member of virtual broadcast domain group 1 450. In this example, virtual broadcast domain group 1 450 includes all network devices or user devices that are owned by the specific user. Furthermore, policy B 475B may specify that all guest users of a network may use a pre-allocated pool of network resources. Accordingly, a user in the role of a guest is a member of virtual broadcast domain group 2 460, which includes all guest client devices as well as all network devices that guest users can access. As another example, policy C 475C may specify that a client device may access network resources that are located within certain proximity. Accordingly, a client device that is on the second floor of a building facility may only access network resources, e.g., printers, projectors, access points, etc., that are on the second floor of the building facility, all of which become members of virtual broadcast domain group 3 470.

Moreover, device 492 generally identifies a network device in the network; radio/port 494 identifies a specific port (for wired connection) or radio (for wireless connection) of the device identified in device 490; and, group 494 indicates the virtual broadcast domain group that the identified radio/port 494 is associated with based on the policy identified by policy 490.

For example, based on information in FIG. 4C, a device can determine which group a received broadcast message belongs to, and can forward the broadcast message accordingly to other ports that are connected to the same group. For example, port 2 485B of access point 430, port 1 485C of access point 435, and port 2 485D of access point 435 are associated with group 1 450. Therefore, if a broadcast message is received on virtual broadcast domain group 1 450, e.g., from port 2 485B of access point 430, port 1 485C of access point 435, and port 2 485D of access point 435 will be the only ports/radios on access point 430 and access point 435 that can receive the broadcast message.

Likewise, radio 2 480B of access point 430 and radio 1 480C of access point 435 are associated with group 2 460. Thus, if a broadcast message is received on virtual broadcast domain group 2 460, e.g., from radio 1 480C of access point 435, only radio 2 480B of access point 430 will received the broadcast message.

As another example, radio 1 480A of access point 430 and port 1 485A of access point 430 are associated with group 3. Therefore, if a broadcast message is received on virtual broadcast domain group 3 470, e.g., from port 1 485A of access point 430, only radio 1 480A of access point 430 will receive the broadcast message.

Multiple Broadcast Groups Memberships

It is possible for a port or radio to be associated with multiple virtual broadcast domain groups. In one embodiment, a port may be associated with multiple virtual broadcast domain groups if the client device connected to the port belongs to multiple virtual broadcast domain groups. In another embodiment, a port may be associated with multiple virtual broadcast domain groups if it is an uplink port connected to another network device, which is connected to multiple client devices on multiple virtual broadcast domains.

Figures 5A, 5B, 5C:
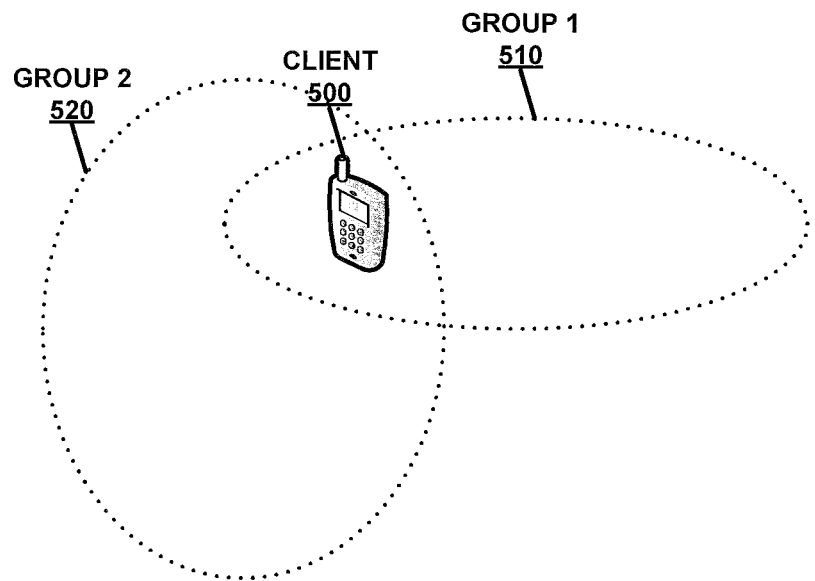
FIGS. 5A-5C illustrate exemplary policy and/or group management according to embodiments of the present disclosure.

FIGS. 5A-5C illustrates exemplary policy and/or group management, especially when a client device belongs to multiple virtual broadcast domains. In FIG. 5A, client device 500 is a member of both virtual broadcast domain group 1 510 and virtual broadcast domain group 2 520.

In some embodiments, a network administrator may configure the virtual broadcast domain settings of the network, such that a broadcast message originated from client device 500 is transmitted on both group 1 510 and group 2 520.

In other embodiments, a network administrator may configure specific rules used to determine which group(s) a broadcast message originated from client device 500 should be transmitted on. The specific rules may be based on header of the broadcast message, content of the broadcast message, time when the broadcast message is sent, location of client device 500 when the broadcast message is sent, location trace of client device 500, etc.

FIG. 5B shows an exemplary broadcast message, which includes at least layer-3 header 530, layer-2 header 540, and payload 550. In some embodiments, a network device may inspect payload 550 to identify a characteristic of the broadcast message, and further determine which virtual broadcast domain group to transmit the message based on the identified characteristic. For example, if the network device identifies that the broadcast message is a video broadcast message, it will always be transmitted on group 1 510, which is dedicated for video broadcasting. As another example, if the network device identifies that the user of the client device has not been authenticated by a corporate network, the broadcast message is always transmitted on group 2 520, which is dedicated to a guest network.

FIG. 5C shows an exemplary dynamic determination of virtual broadcast domains/groups. FIG. 5C includes the following columns or fields—time 560, location 570, group 580, etc. Specifically, time 560 indicates the time when a broadcast message is sent; location 570 indicates the location of device 500 when the broadcast message is sent, and group 580 indicates which virtual broadcast domain the broadcast message will be transmitted on based on the time and location as indicated in the fields time 560 and location 570. For example, if at time $t_1$, client device 500 is located on the $1^{st}$ floor of a facility building, then a broadcast message originated from client device 500 at $t_1$ may be transmitted on virtual broadcast domain group 1 510. On the other hand, if at time $t_2$, client 500 is located on the $2^{nd}$ floor of the same facility building, then a broadcast message originated from client device 500 at $t_2$ may be transmitted on virtual broadcast domain group 2 520.

Process for Overlaying Broadcast Groups on Underlying Physical Networks

Figure 6:
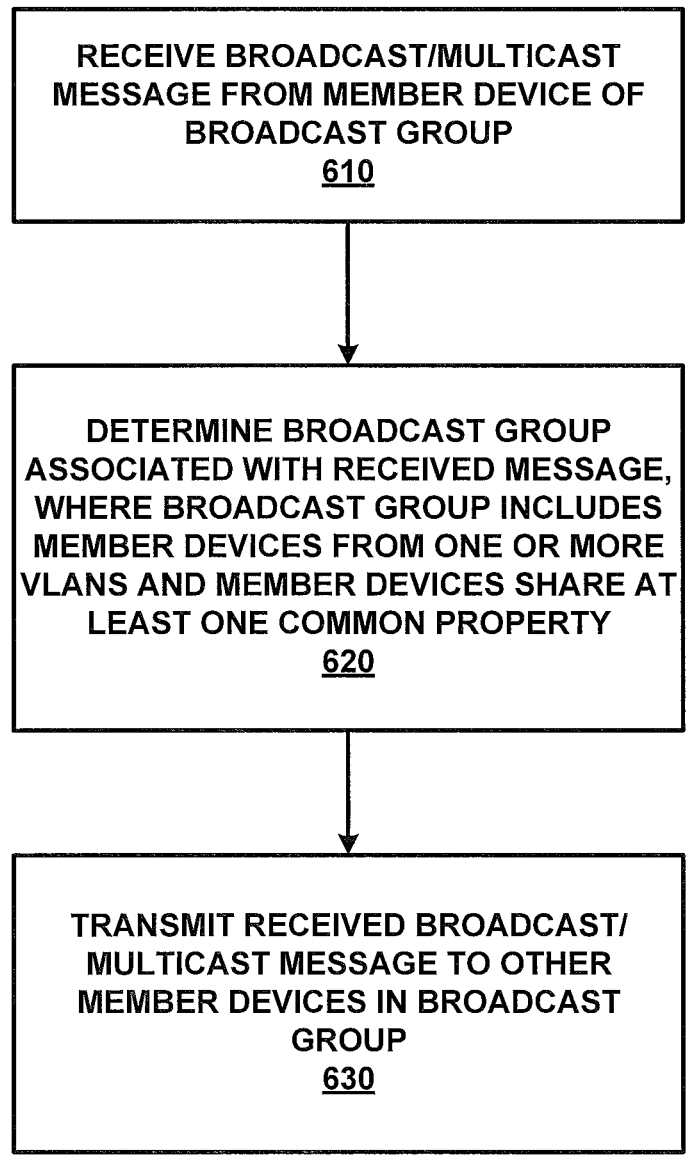
FIG. 6 illustrates a process for overlaying virtual broadcast domains on underlying physical networks according to embodiments of the present disclosure.

FIG. 6 shows a flowchart for overlaying broadcast domains on underlying physical networks according to embodiments of the present disclosure. During operations, a network device receives broadcast or multicast message from a member device of a broadcast group (operation 610).

Then, the network device selects one or more broadcast groups based on received broadcast or multicast message (operation 620). Note that, the virtual broadcast domain/group includes multiple network devices and/or client devices from one or more virtual local area networks. However, the virtual broadcast domain may not include all network devices and/or client devices from those virtual local area networks. Furthermore, the network devices and/or client devices share at least one common property of the virtual broadcast domain.

Next, the network device transmits received broadcast or multicast message to other member devices in the virtual broadcast domain/group (operation 630). Note that, the broadcast or multicast message will only be transmitted to members of the broadcast group, and not non-members of the broadcast group.

System for Overlaying Broadcast Groups on Underlying Physical Networks

Figure 7:
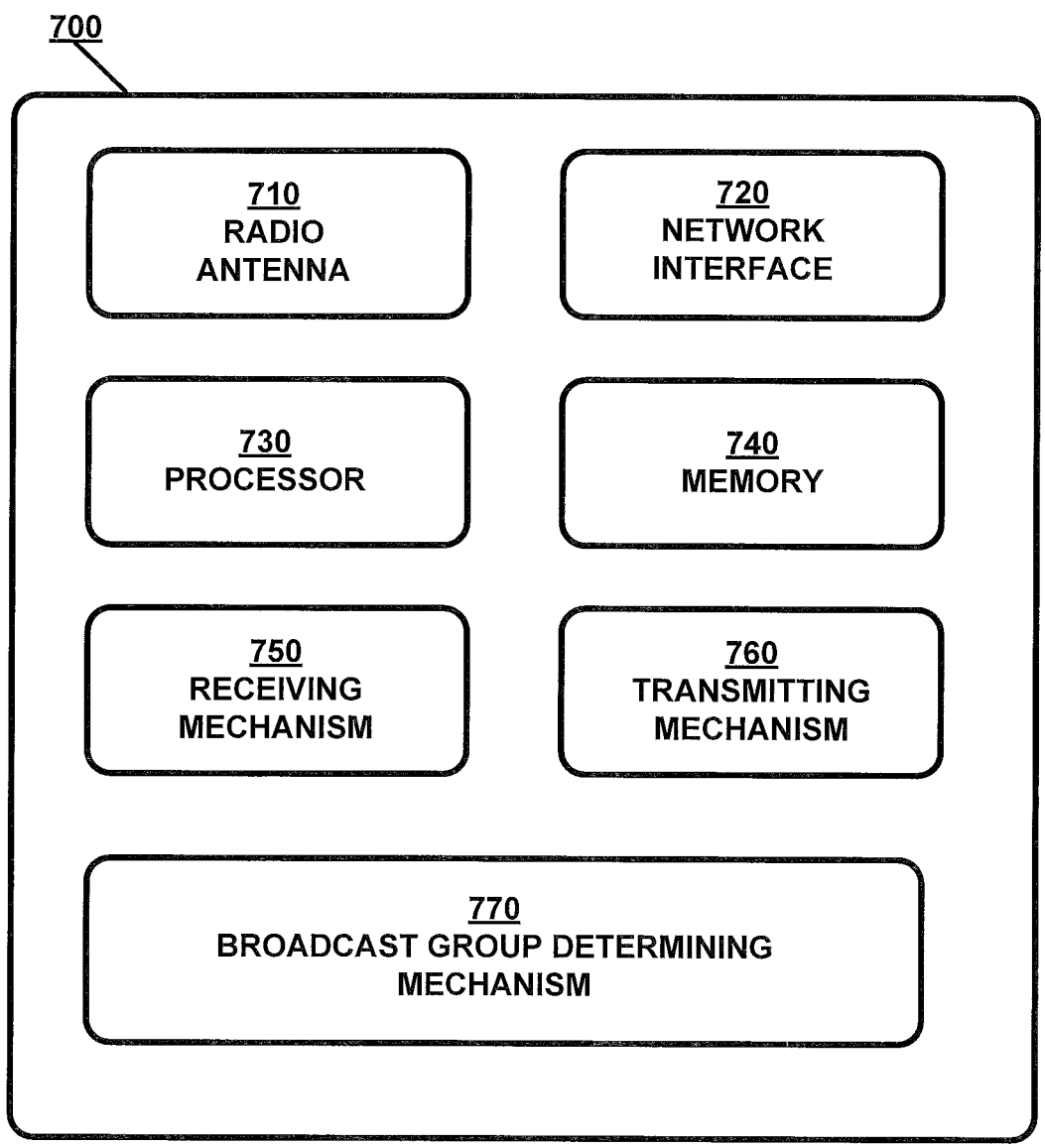
FIG. 7 illustrates a system for overlaying virtual broadcast domains on underlying physical networks according to embodiments of the present disclosure.

FIG. 7 is a block diagram illustrating a system for overlaying broadcast groups on underlying physical networks according to embodiments of the present disclosure.

Network device 700 includes at least one or more radio antennas 710 capable of either transmitting or receiving radio signals or both, a network interface 720 capable of communicating to a wired or wireless network, a processor 730 capable of processing computing instructions, and a memory 740 capable of storing instructions and data. Moreover, network device 700 further includes a receiving mechanism 750, a transmitting mechanism 760, and a broadcast group determining mechanism 770, all of which are in communication with processor 730 and/or memory 740 in network device 700. Network device 700 may be used as a client system, or a server system, or may serve both as a client and a server in a distributed or a cloud computing environment.

Radio antenna 710 may be any combination of known or conventional electrical components for receipt of signaling, including but not limited to, transistors, capacitors, resistors, multiplexers, wiring, registers, diodes or any other electrical components known or later become known.

Network interface 720 can be any communication interface, which includes but is not limited to, a modem, token ring interface, Ethernet interface, wireless IEEE 802.11 interface, cellular wireless interface, satellite transmission interface, or any other interface for coupling network devices.

Processor 730 can include one or more microprocessors and/or network processors. Memory 740 can include storage components, such as, Dynamic Random Access Memory (DRAM), Static Random Access Memory (SRAM), etc.

Receiving mechanism 750 receives one or more network messages via network interface 720 or radio antenna 710 from a wireless client. The received network messages may include, but are not limited to, requests and/or responses, beacon frames, management frames, control path frames, and so on. Each message may comprise one or more data packets, for example, in the form of IP packets.

Transmitting mechanism 760 transmits messages, which include, but are not limited to, requests and/or responses, beacon frames, management frames, control path frames, and so on.

In some embodiments, receiving mechanism 750 receives a broadcast or multicast message from a first network interface 720 or radio antenna 710 of network device 700. Broadcast group determining mechanism 770, according to embodiments of the present disclosure, determines a broadcast group associated with the received broadcast or multicast message based on the common property.

Note that, the broadcast group includes a subset of network devices and client devices in one or more virtual local area networks. In some embodiments, the broadcast group includes a subset of devices from a single virtual local area network. In other embodiments, the broadcast group includes at least two subsets of devices from different virtual local area networks.

Also, the subset of network devices and client devices share at least one common property. Further, transmitting mechanism 760 can transmit the received broadcast message to other member devices in the broadcast group.

In some embodiments, the one or more virtual local area networks are determined by one or more underlying physical networks. In some embodiments, at least two of the client devices in the same broadcast group are associated with different virtual local area networks. In other embodiments, at least two client devices associated with the same virtual local area network are not member devices of the same broadcast group.

In some embodiments, the at least one common property shared by the subset of the devices in the network is derived from a broadcast group membership policy. The broadcast group membership policy may include one or more of a user-based policy, a role-based policy, a location-based policy, a service-based policy, an application-based policy, etc. In some embodiments, the broadcast group membership policy is a member of a broadcast group that includes a plurality of broadcast group membership policies.

In some embodiments, a client device that is a member of a first broadcast group joins a second broadcast group to become a member of at least two broadcast groups based on the broadcast group membership policies. In some embodiments, the client device may join the second broadcast group without direct participation from the client device or alternation of network configurations.

In some embodiments, a client device is a member of a first broadcast group and a non-member of a second broadcast group during a first period of time, and a member of the second broadcast group and a non-member of the first broadcast group during a second period of time. In some embodiments, the client device may leave the first broadcast group and join the second broadcast group based on the broadcast group membership policy without direct participation from the client device or alternation of network configurations.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A computer-implemented method, comprising:
   determining that a network device is a member of two or more member virtual groups of network devices, wherein each network device in a virtual group of the two or more member virtual groups shares a common property, wherein the common property is a property that network devices on different networks have in common;
   receiving, at the network device, a broadcast message;
   determining a characteristic of the broadcast message, wherein the broadcast message is only transmitted to virtual groups of network devices that can receive a broadcast message with the characteristic;
   determining which of the two or more member virtual groups to transmit the broadcast message to using the characteristic; and
   transmitting the broadcast message, wherein the broadcast message is received based on the determined characteristic of the broadcast message.

2. The method of claim 1, wherein the characteristic of the broadcast message is a transmission rule that indicates a list of virtual groups that the broadcast message may be forwarded to.

3. The method of claim 2, wherein the transmission rule is in a header of the broadcast message.

4. The method of claim 1, wherein the characteristic includes one of the group of: content of the broadcast message, a time when the broadcast message was sent, and a location of a device that transmitted the broadcast message.

5. The method of claim 1, further comprising:
   determining that a network device in one of the two or more member virtual groups ceases to share the common property with the other network devices of the virtual group; and
   dynamically updating the virtual group.

6. The method of claim 1, wherein when the broadcast message is received by a subset of network devices in a virtual group, the broadcast message is forwarded to the other members of the virtual group.

7. A computing device, comprising:
   one or more processors; and
   a memory having instructions stored thereon, which when executed by the one or more processors, cause the computing device to perform operations including:
   determining that a network device is a member of two or more member virtual groups of network devices, wherein each network device in a virtual group of the two or more member virtual groups shares a common property, wherein the common property is a property that network devices on different networks have in common;
   receiving, at the network device, a broadcast message;
   determining a characteristic of the broadcast message, wherein the broadcast message is only transmitted to virtual groups of network devices that can receive a broadcast message with the characteristic;
   determining which of the two or more member virtual groups to transmit the broadcast message to using the characteristic; and
   transmitting the broadcast message, wherein the broadcast message is received based on the determined characteristic of the broadcast message.

8. The computing device of claim 7, wherein the characteristic of the broadcast message is a transmission rule that indicates a list of virtual groups that the broadcast message may be forwarded to.

9. The computing device of claim 8, wherein the transmission rule is in a header of the broadcast message.

10. The computing device of claim 7, wherein the characteristic includes one of the group of: content of the broadcast message, a time when the broadcast message was sent, and a location of a device that transmitted the broadcast message.

11. The computing device of claim 7, further comprising instructions, which when executed by the one or more processors, cause the computing device to perform operations including:
   determining that a network device in one of the two or more member virtual groups ceases to share the common property with the other network devices of the virtual group; and
   dynamically updating the virtual group.

12. The computing device of claim 7, wherein when the broadcast message is received by a subset of network devices in a virtual group, the broadcast message is forwarded to the other members of the virtual group.

13. A computer-program product tangibly embodied in a nontransitory machine-readable storage medium, including instructions configured to cause a data processing apparatus to:
- determine that a network device is a member of two or more member virtual groups of network devices, wherein each network device in a virtual group of the two or more member virtual groups shares a common property, wherein the common property is a property that network devices on different networks have in common;
- receive at the network device, a broadcast message;
- determine a characteristic of the broadcast message, wherein the broadcast message is only transmitted to virtual groups of network devices that can receive a broadcast message with the characteristic;
- determine which of the two or more member virtual groups to transmit the broadcast message to using the characteristic; and
- transmit the broadcast message, wherein the broadcast message is received based on the determined characteristic of the broadcast message.

14. The computer-program product of claim 13, wherein the characteristic of the broadcast message is a transmission rule that indicates a list of virtual groups that the broadcast message may be forwarded to.

15. The computer-program product of claim 14, wherein the transmission rule is in a header of the broadcast message.

16. The computer-program product of claim 13, wherein the characteristic includes one of the group of: content of the broadcast message, a time when the broadcast message was sent, and a location of a device that transmitted the broadcast message.

17. The computer-program product of claim 13, further comprising instructions configured to cause the data processing apparatus to:
- determine that a network device in one of the two or more member virtual groups ceases to share the common property with the other network devices of the virtual group; and
- dynamically updating the virtual group.

18. The computer-program product of claim 13, wherein when the broadcast message is received by a subset of network devices in a virtual group, the broadcast message is forwarded to the other members of the virtual group.

* * * * *